(12) United States Patent
Prathipati et al.

(10) Patent No.: US 12,459,650 B2
(45) Date of Patent: Nov. 4, 2025

(54) CONVERTING ECONOMY SEAT TO FULL FLAT BED BY DROPPING SEAT BACK FRAME

(71) Applicant: B/E Aerospace, Inc., Winston-Salem, NC (US)

(72) Inventors: Krishna Chaitanya Prathipati, Hyderabad (IN); Ravindra Ramulu Kandukuri, Secunderabad (IN); Ganesh Pralhad Bawaskar, Hyderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 175 days.

(21) Appl. No.: 18/370,674

(22) Filed: Sep. 20, 2023

(65) Prior Publication Data
US 2024/0425181 A1 Dec. 26, 2024

(30) Foreign Application Priority Data
Jun. 23, 2023 (IN) .............................. 202311041901

(51) Int. Cl.
*B64D 11/06* (2006.01)
(52) U.S. Cl.
CPC ...... *B64D 11/0641* (2014.12); *B64D 11/0647* (2014.12)
(58) Field of Classification Search
CPC ........................ B64D 11/0641; B64D 11/0647
USPC ........................................................ 297/63
See application file for complete search history.

(56) References Cited

U.S. PATENT DOCUMENTS

| | | | | | |
|---|---|---|---|---|---|
| 2,815,794 | A | * | 12/1957 | Hendrickson | B61D 33/0021 297/321 |
| 2,953,103 | A | * | 9/1960 | Bohannon | B61D 31/00 244/118.6 |
| 3,983,729 | A | * | 10/1976 | Traczyk | B21D 51/2615 72/94 |
| 6,663,173 | B1 | * | 12/2003 | Corfitsen | B61D 31/00 297/62 |
| 6,715,716 | B1 | * | 4/2004 | Cheung | B64D 11/0643 244/122 R |
| 8,840,163 | B1 | | 9/2014 | Wilhelm et al. | |

(Continued)

FOREIGN PATENT DOCUMENTS

| | | | | |
|---|---|---|---|---|
| EP | 3919389 | A1 * | 12/2021 | ......... B64D 11/0023 |
| WO | WO-2019089075 | A1 * | 5/2019 | ............. B60N 2/995 |

OTHER PUBLICATIONS

European Patent Office, Extended European Search Report received in EP Application No. 24183228.6, Sep. 16, 2024, 4 pages.

*Primary Examiner* — David E Sosnowski
(74) *Attorney, Agent, or Firm* — Suiter Swantz IP

(57) ABSTRACT

A seat row including a plurality of seats supported by a seat frame. Each seat includes a seat pan, a backrest, and a backrest frame positioned in surrounding relation to the backrest. The backrest frame reclines with the backrest and deploys away from the backrest to a position overlaying the seat pan to provide a substantially horizontal surface for overlaying a mattress on the deployed backrest frames. In embodiments, the mattress stows in a folded condition in one of the seats and is retrieved from, fills, and expands to cover the deployed backrest frames to form a flat bed. In some embodiments, the seat row provides a provision for sleeping in an economy class cabin of an airliner.

20 Claims, 18 Drawing Sheets

(56) References Cited

U.S. PATENT DOCUMENTS

| | | | | |
|---|---|---|---|---|
| 9,545,999 | B2* | 1/2017 | Henshaw | B64D 11/0641 |
| 9,650,145 | B2* | 5/2017 | Lambert | B64D 11/0639 |
| 10,343,780 | B2* | 7/2019 | Portoles | B64D 11/0649 |
| 10,688,890 | B2* | 6/2020 | Mallette | B60N 2/2222 |
| 10,696,409 | B2* | 6/2020 | Lee | B64D 11/0601 |
| 10,787,262 | B2* | 9/2020 | Ward | A47C 11/005 |
| 11,396,377 | B1* | 7/2022 | Zurian | B60N 2/5833 |
| 2015/0166183 | A1* | 6/2015 | Henshaw | B64D 11/064 |
| | | | | 244/118.6 |
| 2016/0325838 | A1* | 11/2016 | Erhel | B60N 2/34 |
| 2017/0021930 | A1* | 1/2017 | Henshaw | B64D 11/064 |
| 2019/0308732 | A1* | 10/2019 | Croudace | B64D 11/064 |
| 2023/0391455 | A1* | 12/2023 | Kodati | B64D 11/0641 |
| 2024/0010342 | A1* | 1/2024 | Koustubhan | B64D 11/0647 |
| 2024/0043123 | A1* | 2/2024 | Kodati | B64D 11/0644 |
| 2024/0425181 | A1* | 12/2024 | Prathipati | B64D 11/06 |
| 2025/0051014 | A1* | 2/2025 | Sharma | B64D 11/0641 |
| 2025/0074598 | A1* | 3/2025 | Prathipati | B64D 11/0638 |

* cited by examiner

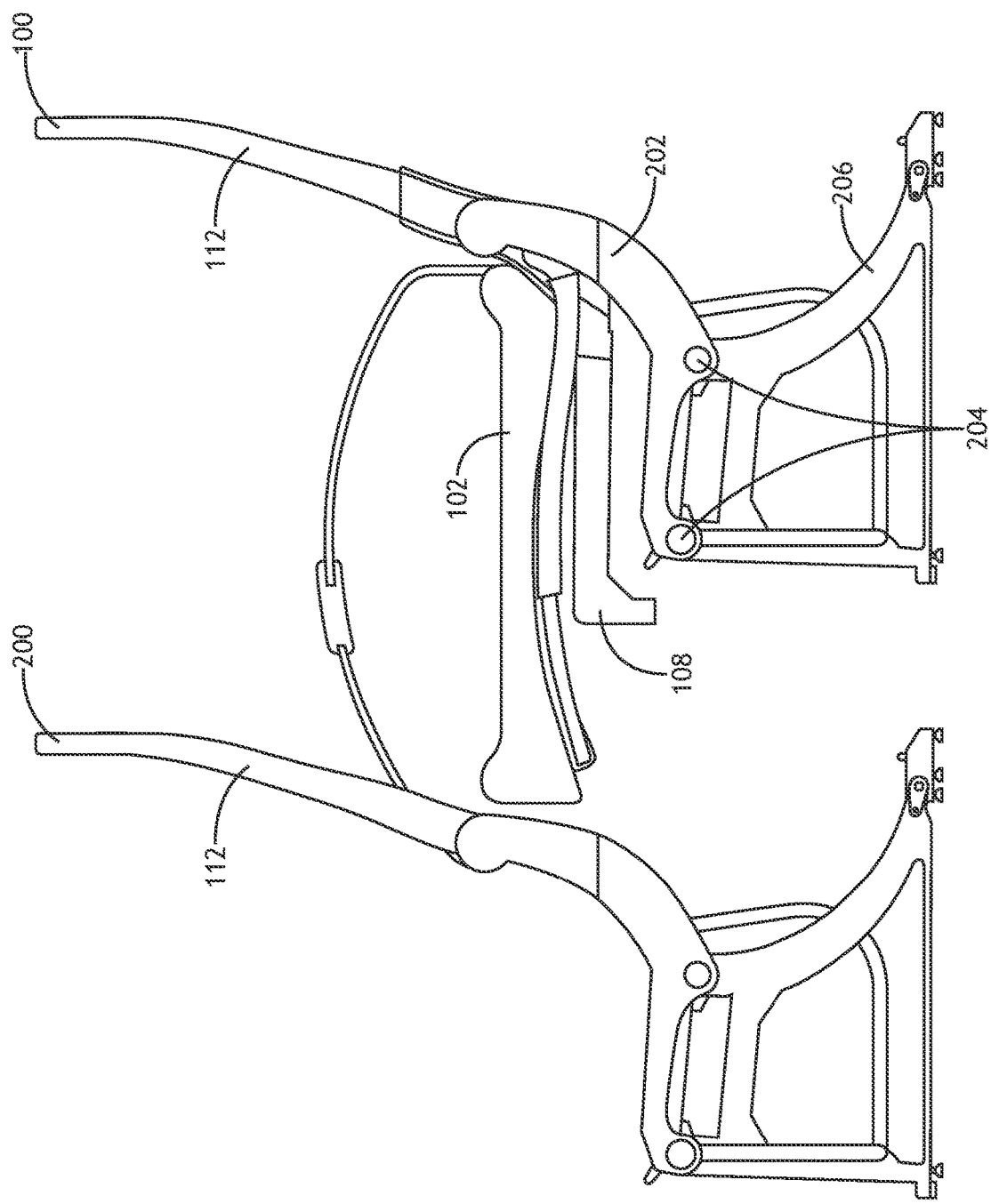

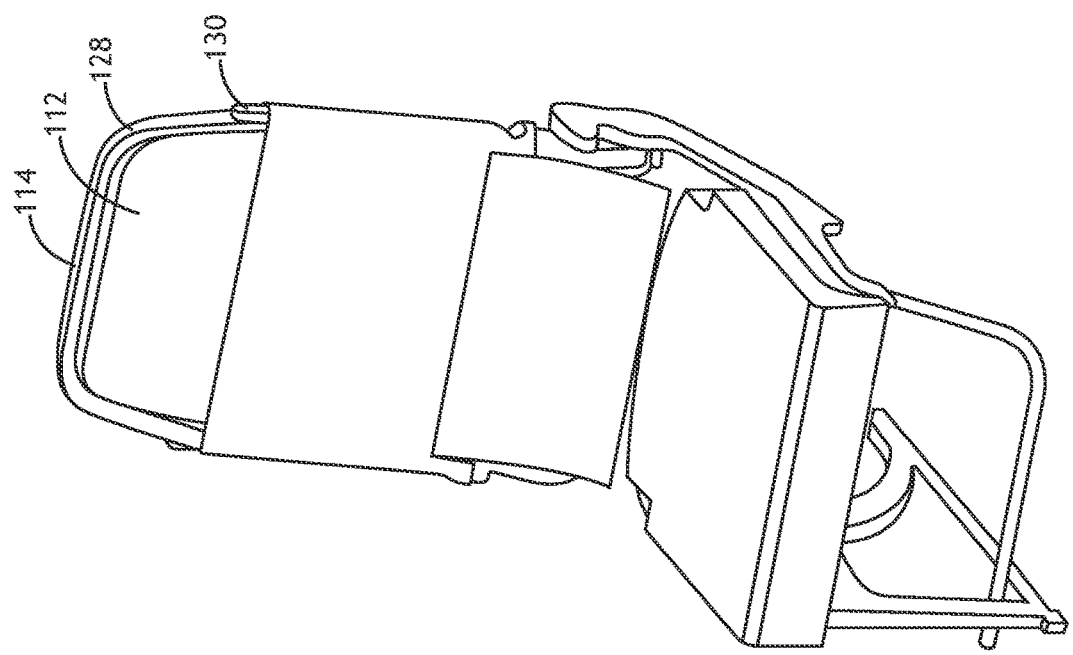

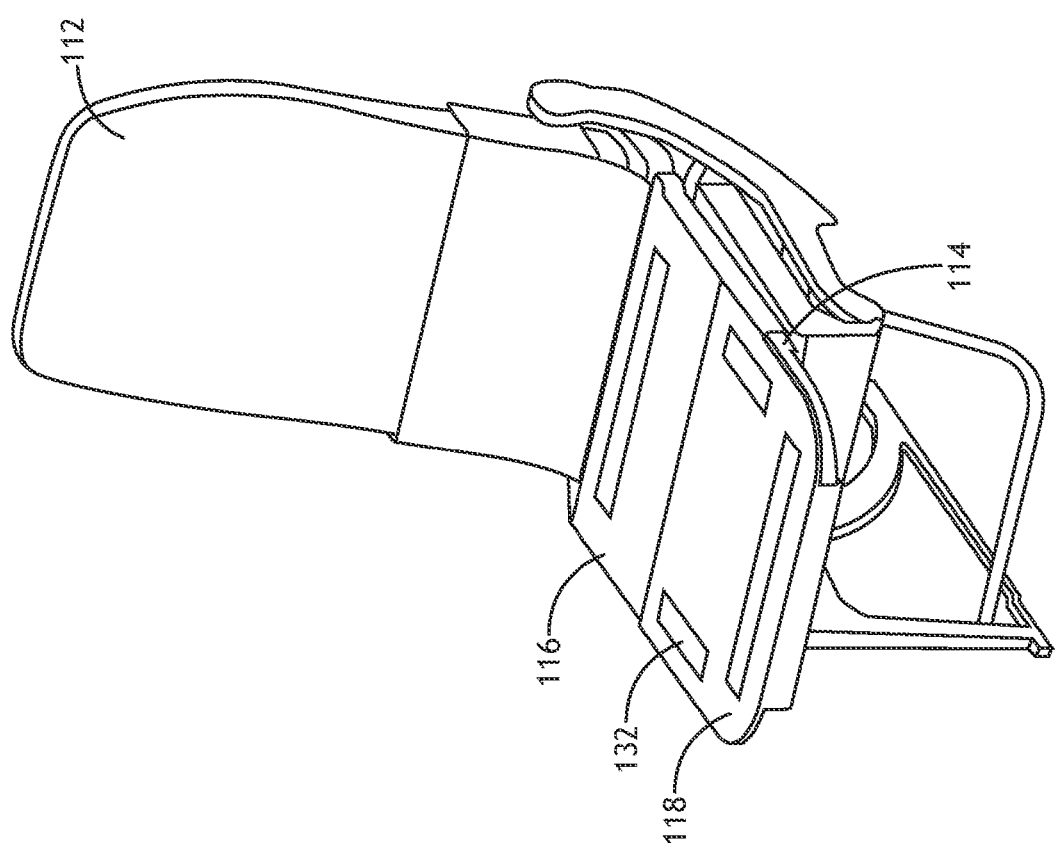

CONVERTING ECONOMY SEAT TO FULL FLAT BED BY DROPPING SEAT BACK FRAME

RELATED APPLICATION AND INCORPORATION BY REFERENCE

This nonprovisional application claims the benefit of priority of India Provisional Patent Application No. 202311041901 filed Jun. 23, 2023, for "ECONOMY CLASS SEAT ROW CONVERTIBLE TO A BED," which is hereby incorporated by reference in its entirety.

TECHNICAL FIELD AND BACKGROUND

The present disclosure relates generally to provisions for sleeping in an economy class cabin, and more particularly, to an economy class seat row configured to convert to a flat bed.

Passenger cabins in airliners typically include separate economy and premium seating classes. Premium seating classes, where comfort is paramount, may include highly adjustable passenger seats configured to transition from an upright sitting position to a flat bed through various intermediate sitting positions. Economy seating classes, where density is paramount, may include integrated seat rows with limited backrest recline.

Most passengers are not able to assume a comfortable sleeping position in an economy class seat considering the steep angle of the backrest even in a fully reclined state, fixed position of the seat pan, lack of a leg rest, shared armrests, and close proximity to other passengers. As such, passengers not able to afford the high cost of a premium class seat are at sleeping disadvantage, particularly on long haul flights.

Therefore, what is needed is a provision for sleeping in an economy class cabin.

BRIEF SUMMARY

In one aspect, embodiments of the inventive concepts disclosed herein are directed to a seat row convertible to a bed. In embodiments, the seat row includes seats supported by a frame, wherein each seat includes a seat pan, a backrest, and a backrest frame positioned in surrounding relation to the backrest. The backrest frame is movable, such as by rotation, between a stowed position with the backrest and a deployed position overlaying the seat pan. In embodiments, the backrest frame carries a reconfigurable diaphragm movable with the backrest frame. The seat row further includes, or is compatible for use with, a mattress configured to be installed overlaying the backrest frames of the seats when in the deployed position.

In some embodiments, the diaphragm includes a first part and a second part, the second part is folded against the first part when the backrest is in the stowed position, the second part is configured to be unfolded from against the first part when the backrest frame is in the deployed position, and the first part and the second part together, when the second part is unfolded from against the first part, substantially fill an opening defined by the backrest frame.

In some embodiments, the backrest and the backrest frame of each seat share an axis of rotation.

In some embodiments, the mattress is an air mattress configured to, when in a deflated state, fold and stow within an interior space provided behind the diaphragm of one of the seats.

In some embodiments, each seat further includes an additional diaphragm covering a portion of the backrest and a gap formed between the bottom of the backrest and the seat pan, wherein the additional frame is separate from and does not move with the backrest frame.

In some embodiments, the seat row further includes an adjustable passenger restraint webbing configured to attach at one end to a forward seat frame and attach at an opposing end to a passenger restraint of one of the seats of the seat row.

In some embodiments, when the backrest frame is in the stowed position, the diaphragm leaves uncovered a headrest portion of the backrest and covers a portion of the backrest positioned below the headrest portion of the backrest.

In some embodiments, the seat row includes at least two seats, and more preferably at least three seats.

In some embodiments, the backrest frame carries a spring-loaded release pin configured to engage in the backrest when the backrest frame is in the stowed position, and disengage from the backrest to allow the backrest frame to be moved toward the deployed position.

In some embodiments, the seat row further includes fasteners, for instance hook-and-loop fasteners for repeatable securement of the mattress in place atop the deployed backrest frames.

In some embodiments, the backrest and the backrest frame of each seat, when the backrest frame is in the stowed position, are configured to recline together as a single unit.

In some embodiments, the seat frame includes spreaders positioned at the ends of the seat row and between the seats, spaced transverse beam tubes, and legs for attachment to the floor.

According to another aspect, the present disclosure provides a seat row for installation in an economy class cabin of an aircraft, the seat row configured to convert from a seat row to a bed. The seat row includes three seats supported by a seat frame. Each seat includes a seat pan, a backrest, and a backrest frame positioned in surrounding relation to the backrest, the backrest frame movable between a stowed position with the backrest and a deployed position overlaying the seat pan. In embodiments, a mattress, such as a mattress stowable in one of the seats, is configured to be installed overlaying the backrest frames of the seats when in the deployed position.

In some embodiments, each seat further includes a diaphragm including a first part and a second part, the second part is folded against the first part when the backrest is in the stowed position, the second part is configured to be unfolded from against the first part when the backrest frame is in the deployed position, and the first part and the second part together, when the second part is unfolded from against the first part, substantially fill an opening defined by the backrest frame.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 9 is a side elevation view showing a seat row configured as a bed and the positional relationship thereof to a forward seat row, in accordance with example embodiments of this disclosure;

FIGS. 10A-B are front perspective views of an alternative backrest frame construction shown stowed and deployed, respectively, in accordance with example embodiments of this disclosure;

DETAILED DESCRIPTION

Figure 1:
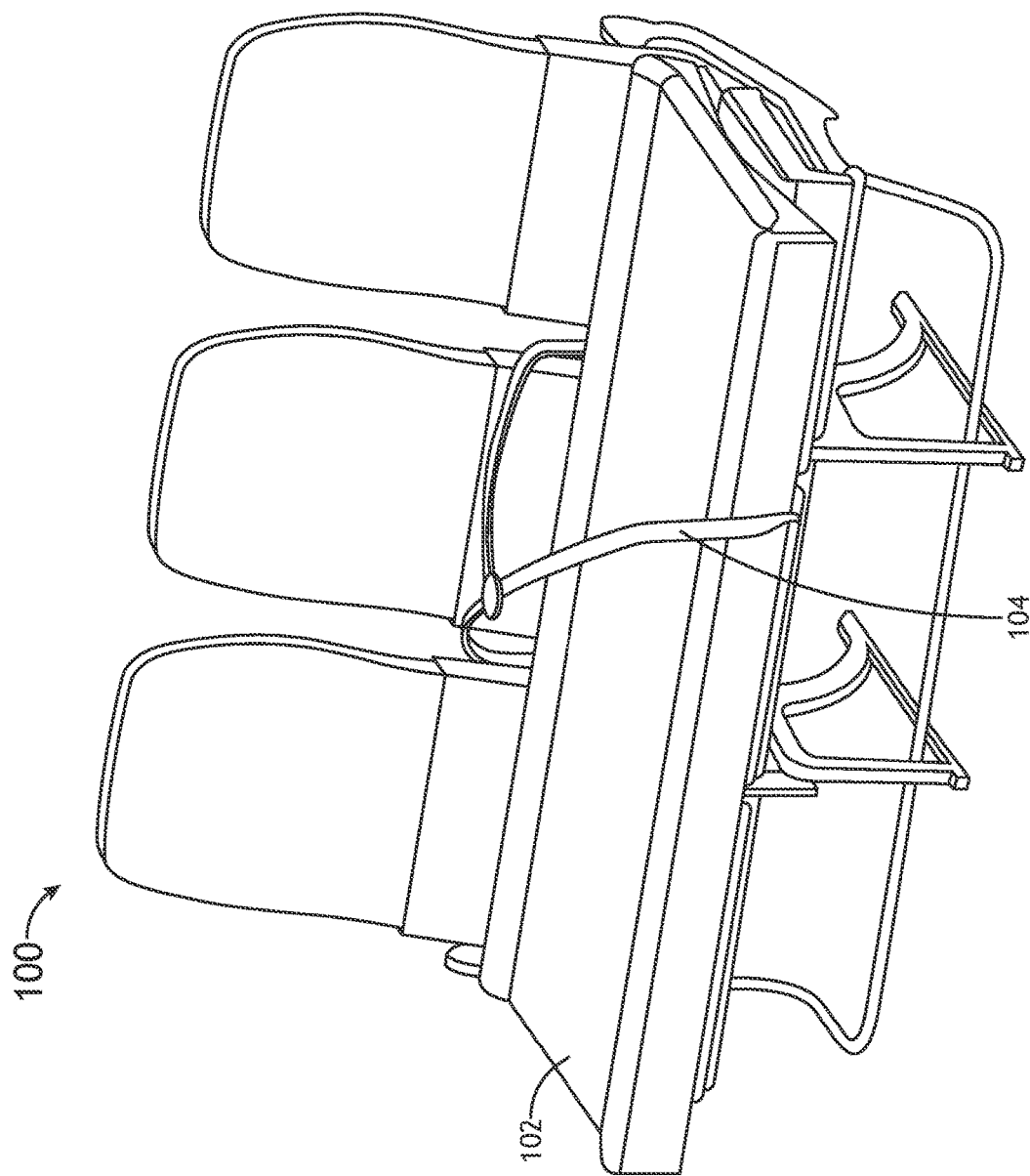
FIG. 1 is an isometric view of a seat row configured as a bed, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a seat row reconfigurable between passenger seats and a bed. In embodiments, the seat row is an integrated construction including a plurality of laterally adjacent seats, for instance 2, 3, 4 . . . n number of seats. When configured as passenger seats, the seat row has the appearance of any other seat row to provide a uniform look throughout the cabin. When configured as a bed, part of the backrest assembly of each seat rotates to a position overlaying the seat pan such that the backrest frames together form a substantially horizontal surface for positioning a separate mattress overlaying the backrest frames. The mattress may be stowed in a folded configuration in an interior space defined in the one of the seats within the row, and retrieved during the seat row conversion, unfolded, and in some embodiments inflated. In embodiments, the mattress extends from one end of the seat row to the other, and substantially fills the space from the seat backrests to the backside of a forward seat row.

In use, when the passenger cabin is full and all or nearly all seats are sold, the seat row may be configured as passenger seats. When a number of seats in the passenger cabin are not sold, passenger assignments may be shuffled to make the seat row available to a single passenger for purchase at a premium, and that passenger purchasing the seat row has the option to convert the seat row to a bed during flight. In some embodiments, several seat rows according to the present disclosure may be strategically positioned within the cabin to provide the ability to convert at least some of the seat rows to beds during flight. The convertible seat rows may be positioned at the front or rear of the cabin for more privacy for sleeping.

FIG. 1 illustrates the seat row 100 converted to a bed. As discussed in detail below, part of a backrest assembly of each seat rotates to a position overlaying its respective seat pan to provide a substantially horizontal surface for supporting and positioning a mattress 102. In embodiments, the mattress 102 may be an air mattress capable of being deflated, folded, and stowed in an interior space formed in one the seats within the row, for instance behind the diaphragm of one of the seats, and retrieved during the conversion process, unfolded, and inflated. In other embodiments, the mattress 102 may be a cushion stored within one of the seats or elsewhere in the cabin. In embodiments, the mattress 102 may have a particular profile to fill the uneven spaces defined by the converted seats, and front and/or rear raised lips to maintain the position of the sleeping passenger. In embodiments, a separate passenger restraint, implemented as a webbing 104, removably attaches at one end to one of the passenger seat restraints (e.g., the middle seat passenger restraint), and at the other end to structure below the mattress, the frame of the forward seat row, bulkhead, or other structure positioned directly forward of the converted seat row.

Figure 2:
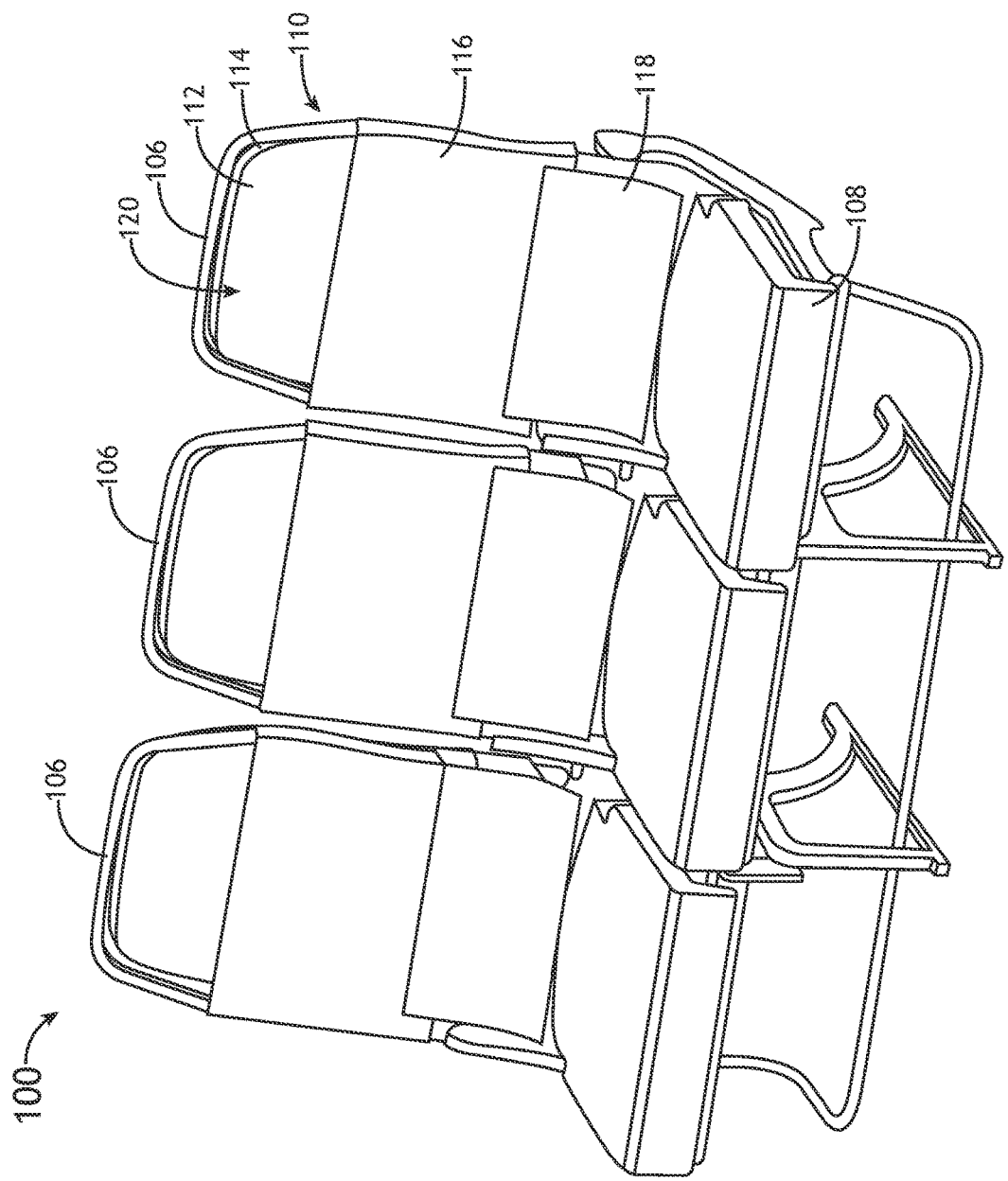
FIG. 2 is an isometric view of the seat row of FIG. 1 configured as passenger seats, in accordance with example embodiments of this disclosure.

FIG. 2 illustrates the seat row 100 configured as a number of passenger seats 106. In a non-limiting example, the seat row 100 includes three laterally-adjacent seats 106. The number of seats 106 in the seat row 100 may vary depending on the seat widths and desired bed length. Each seat 106 generally includes a seat pan 108 and a backrest assembly 110. Although not shown, each backrest assembly may include cushioning and a dress cover. The backrest assembly 110 generally includes a backrest 112 and a backrest frame 114 positioned in surrounding relation to the backrest 112. The backrest 112 provides the primary back support to the sitting passenger and operates like a conventional backrest in that, in some embodiments, the backrest 112 is configured to rotate between an upright sitting position for taxi, takeoff and landing (TTOL), and a reclined sitting position during flight. In some embodiments, the position of the backrest 112 may be fixed.

The backrest frame 114 is positioned in surrounding relation to the backrest 112. As shown, the backrest frame 114 surrounds the backrest 112 on three sides (i.e., left side, right side, and top), and defines an interior space in which the backrest 112 is positioned. In embodiments, the backrest frame 114 may be tubular and constructed from materials such as aluminum, composites, and combinations thereof. In some embodiments, the backrest 112 and the backrest frame 114 together have a width that substantially corresponds to a standard seat without a backrest frame 114. For example, in some embodiments, a standard backrest without a backrest frame may have a width of about 18 inches, while a backrest assembly 110 according to the present disclosure may have also have a total width of about 18 inches, wherein the width of the backrest 112 is about 16 inches and the width each of side of the backrest frame 114 is about 1 inch for a combined total of about 18 inches. As such, the appearance of each backrest in the cabin, when no seats are converted, is substantially the same.

Each seat 106 further includes at least one diaphragm. In embodiments, each backrest assembly 110 includes a first diaphragm 116 attached to the backrest frame 114, and a second diaphragm 118 extending from about a bottom of the backrest 112 to the back of the seat pan 108 to fill the gap formed between the backrest 112 and the seat pan 108. The first diaphragm 116 may be construed from fabric, held in tension by the backrest frame 112, and spans across the width of the backrest 112. In embodiments, the first diaphragm 116 may leave open the headrest portion 120 of the backrest 112.

Figure 3A:
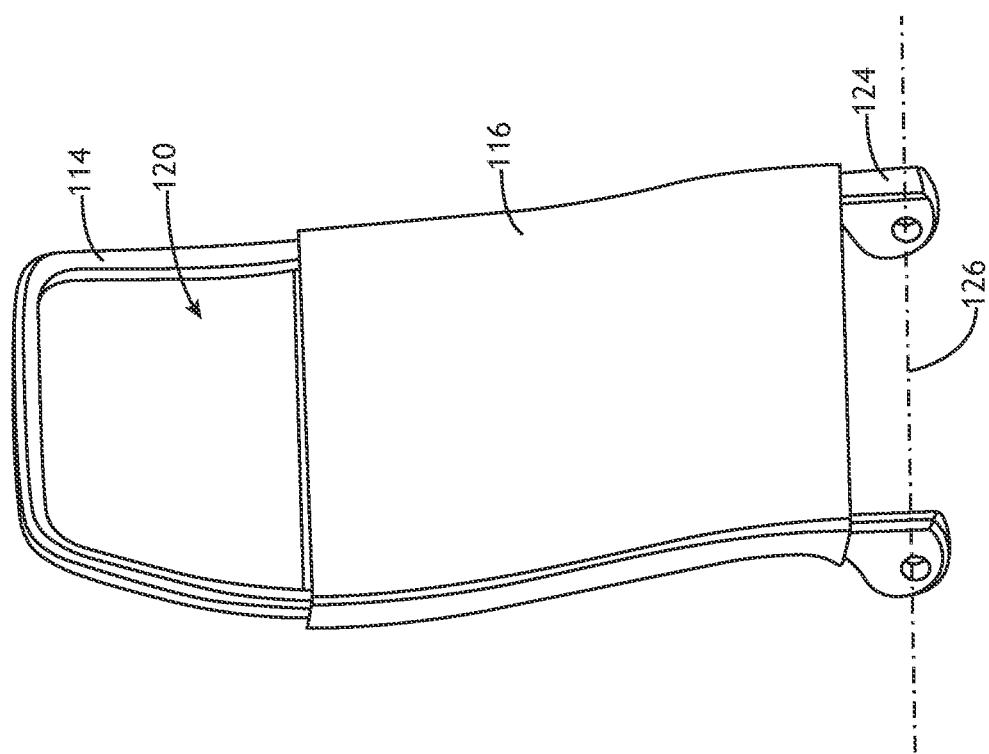
FIGS. 3A-B are respective front and back perspective views of a backrest when in a stowed configuration, in accordance with example embodiments of this disclosure.
Figure 3B:
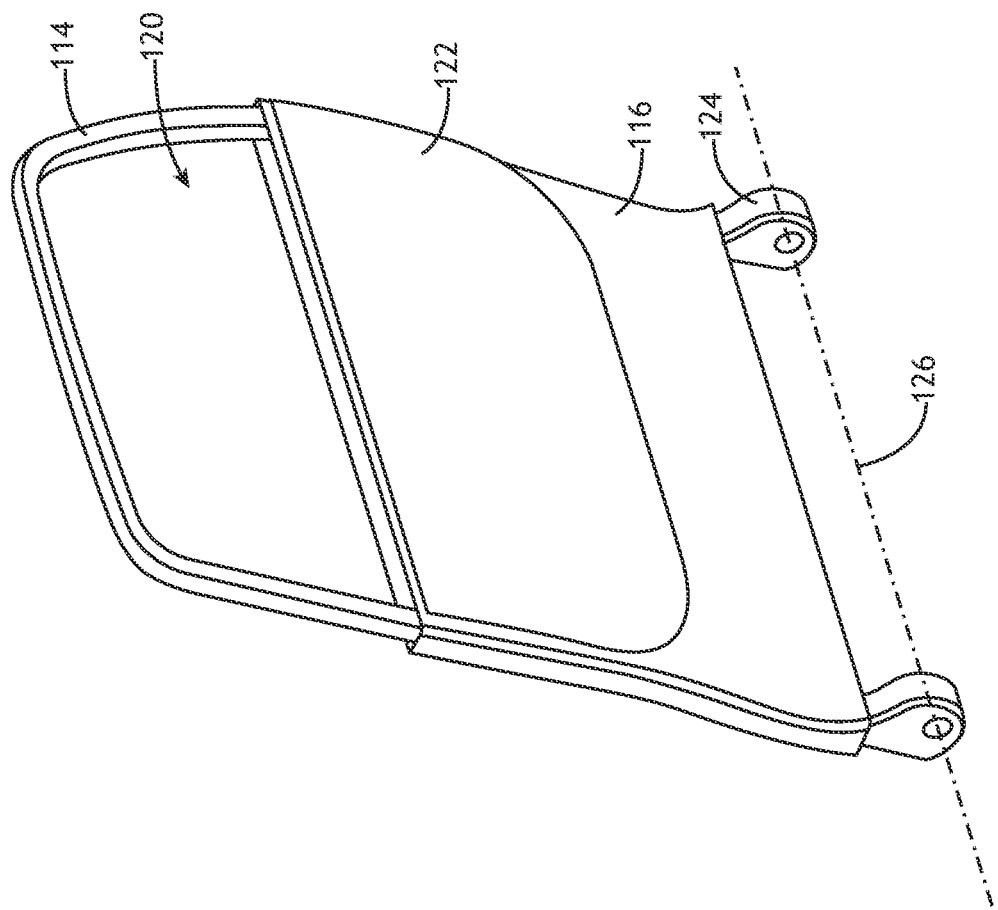

FIGS. 3A-B illustrate the first diaphragm 116 when the backrest frame 114 is in the stowed position corresponding to an unconverted seat. In embodiments, the backrest frame 114 frames the opening 120 of the headrest portion and the first diaphragm 116 leaves open the framed headrest opening. The first diaphragm 116 includes an attached headrest diaphragm 122 that folds against the first diaphragm 116 in the stowed state of the backrest frame 114. The ends of the backrest frame 124 define openings for attaching the backrest frame 124 to the seat frame and the axis of rotation 126 of the backrest frame 114.

Figure 4A:
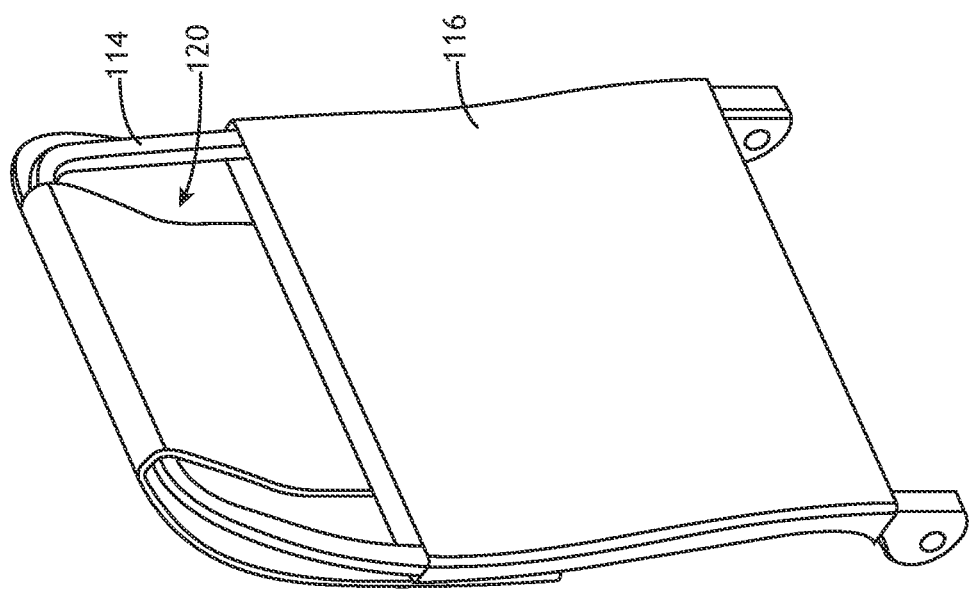
FIGS. 4A-B are respective front and back perspective views of the backrest when in a deployed configuration, in accordance with example embodiments of this disclosure.
Figure 4B:
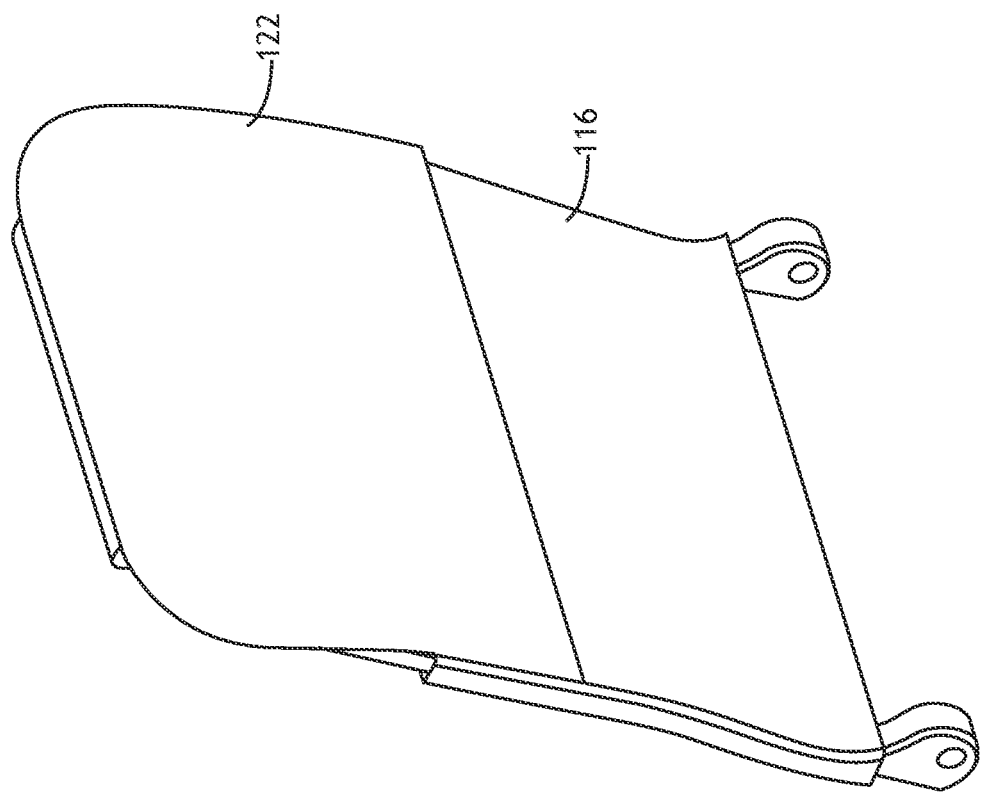

FIGS. 4A-B illustrate the first diaphragm 116 when the backrest frame 114 is in the deployed position corresponding to a converted seat (i.e., overlaying the seat pan). The headrest diaphragm 122 may unfold from against the first diaphragm 116 to cover the headrest opening 120. The headrest diaphragm 122 may be attached to the first diaphragm 116, or the headrest diaphragm 122 and the first diaphragm 116 may be separate, wherein the headrest diaphragm stows between uses in an interior space formed behind the first diaphragm 116.

Figure 5A:
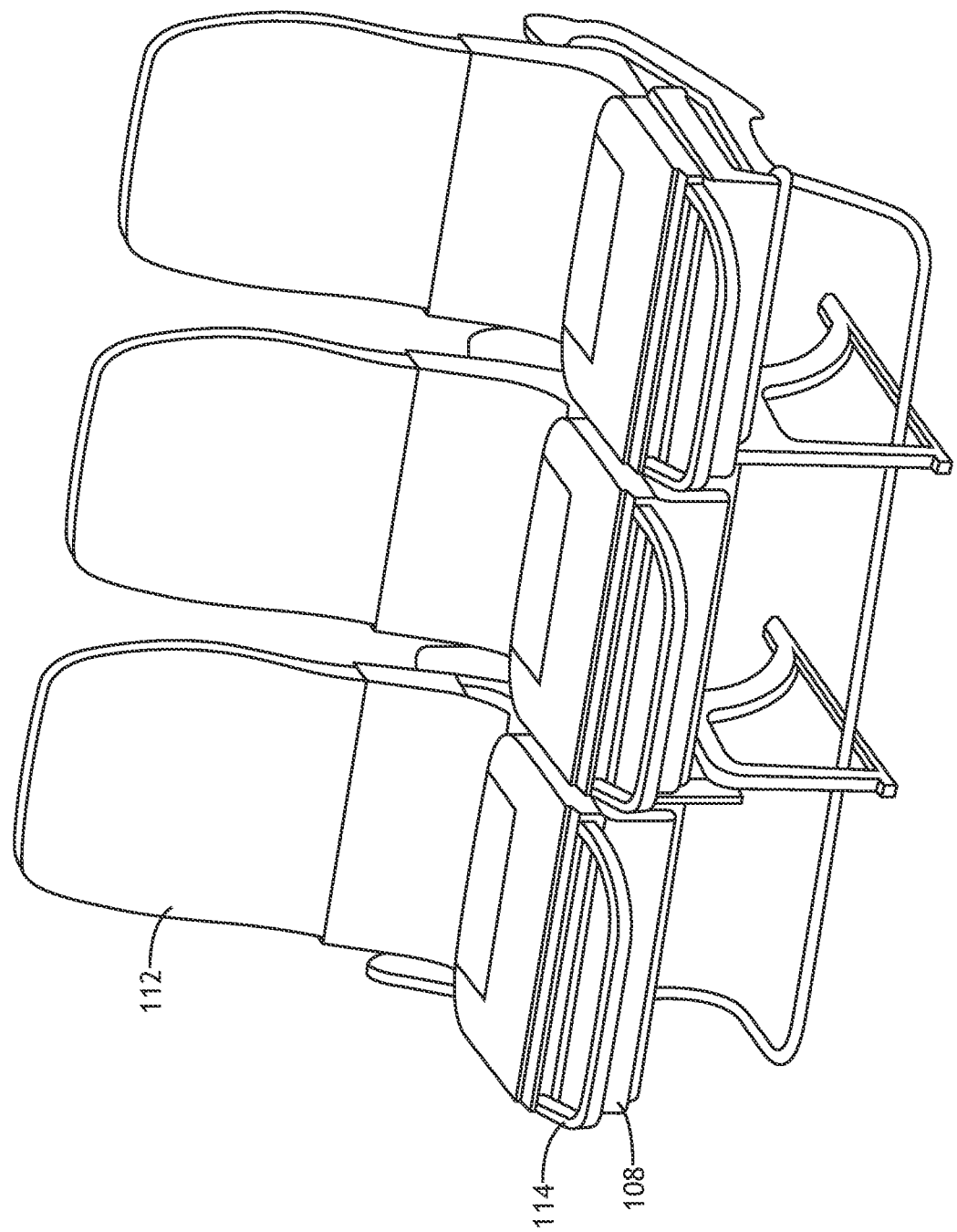
FIGS. 5A-D are sequential views of the steps for converting the seat row from passenger seats to a bed, in accordance with example embodiments of this disclosure.
Figure 5B:
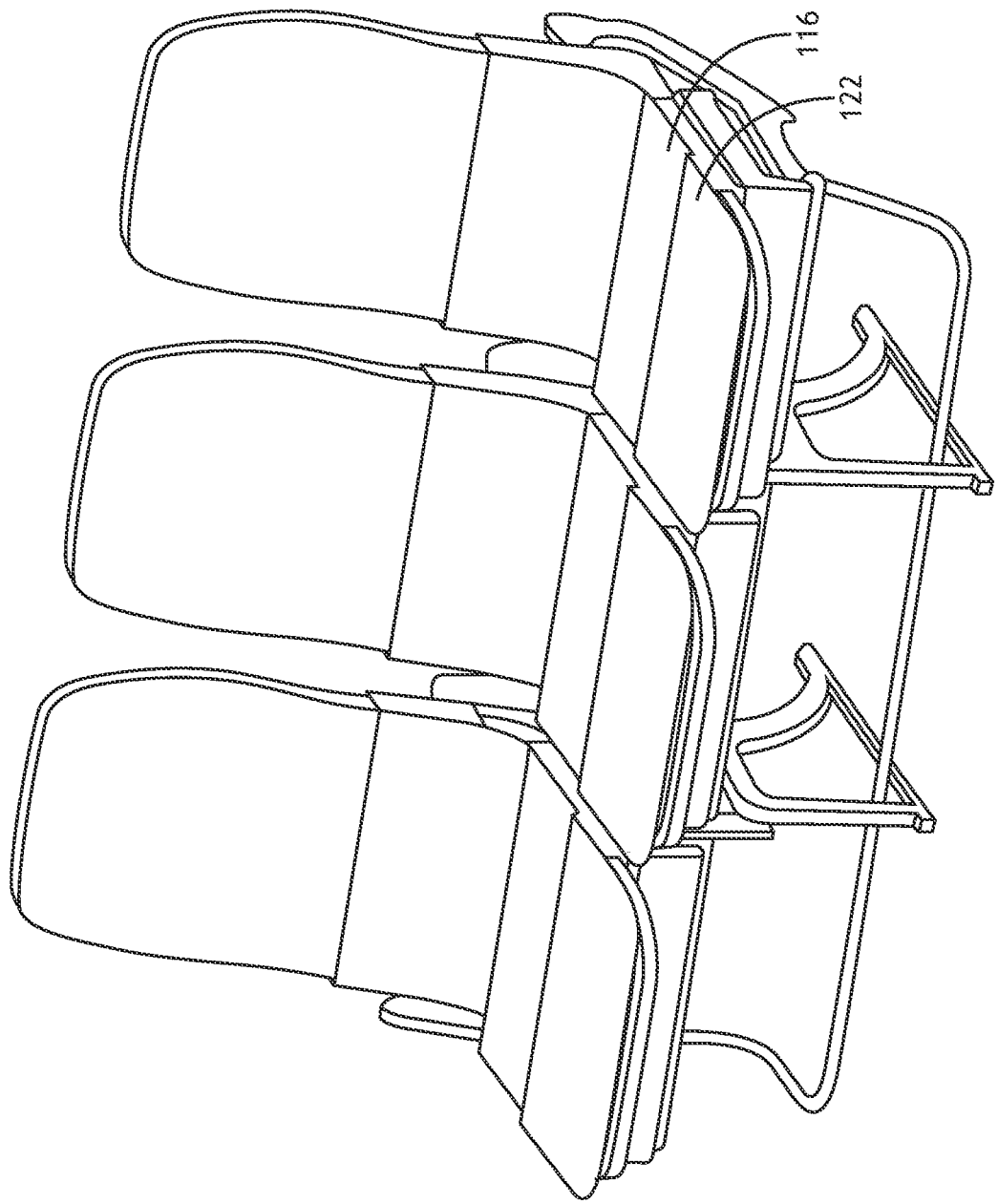
Figure 5C:
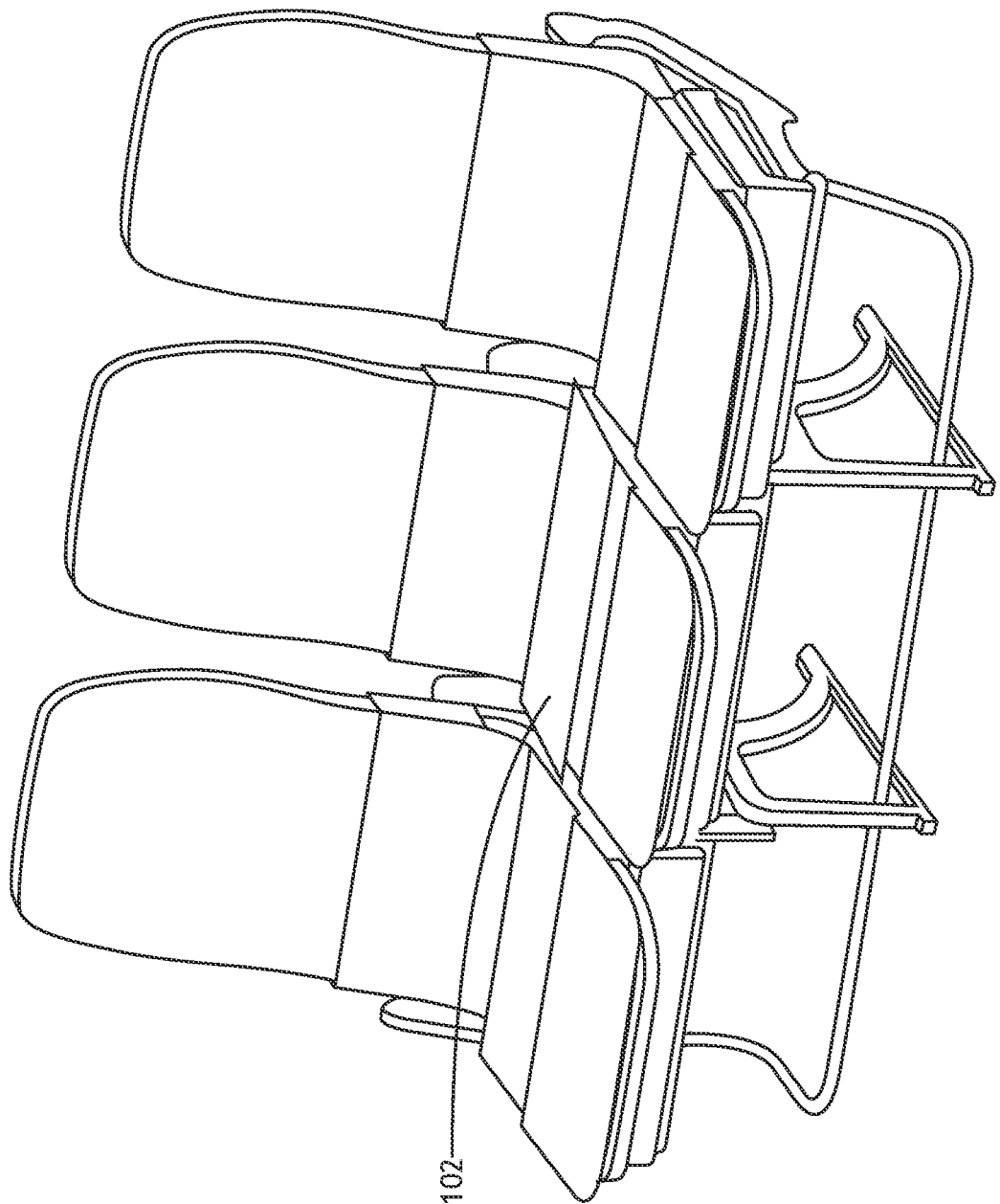
Figure 5D:
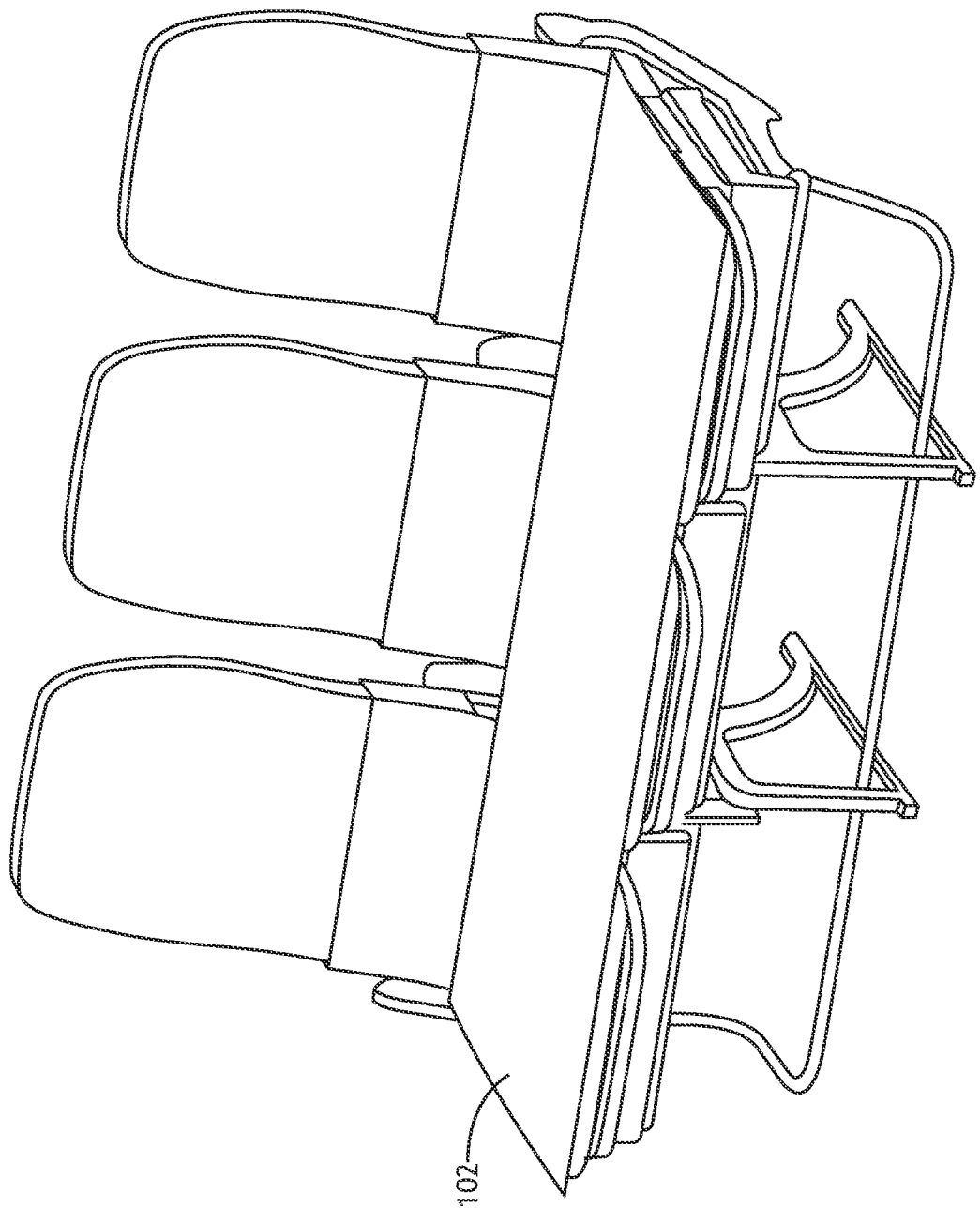

FIGS. 5A-D illustrate sequential views of the seat row conversion process. Starting with the seat row as shown in FIG. 2 with each backrest frame positioned upright and with its respective seatback, FIG. 5A shows a first step of the conversion in which each backrest frame 114 is released from its respective backrest 112 and rotated downward to a position overlaying its respective seat pan 108. FIG. 5B shows a second step in which the headrest diaphragm 122 is unfolded from against the first diaphragm 116, or when provided separately, repositioned to cover the headrest opening to substantially fill the backrest frame opening. FIG. 5C shows a step in which the mattress 102 is retrieved from its stowage location (e.g., within the backrest or stowed elsewhere within the cabin) and positioned on one of the backrest frames. FIG. 5D shows a step in which the mattress 102 is unfolded to form the bed, and in some embodiments inflated.

Figure 6:
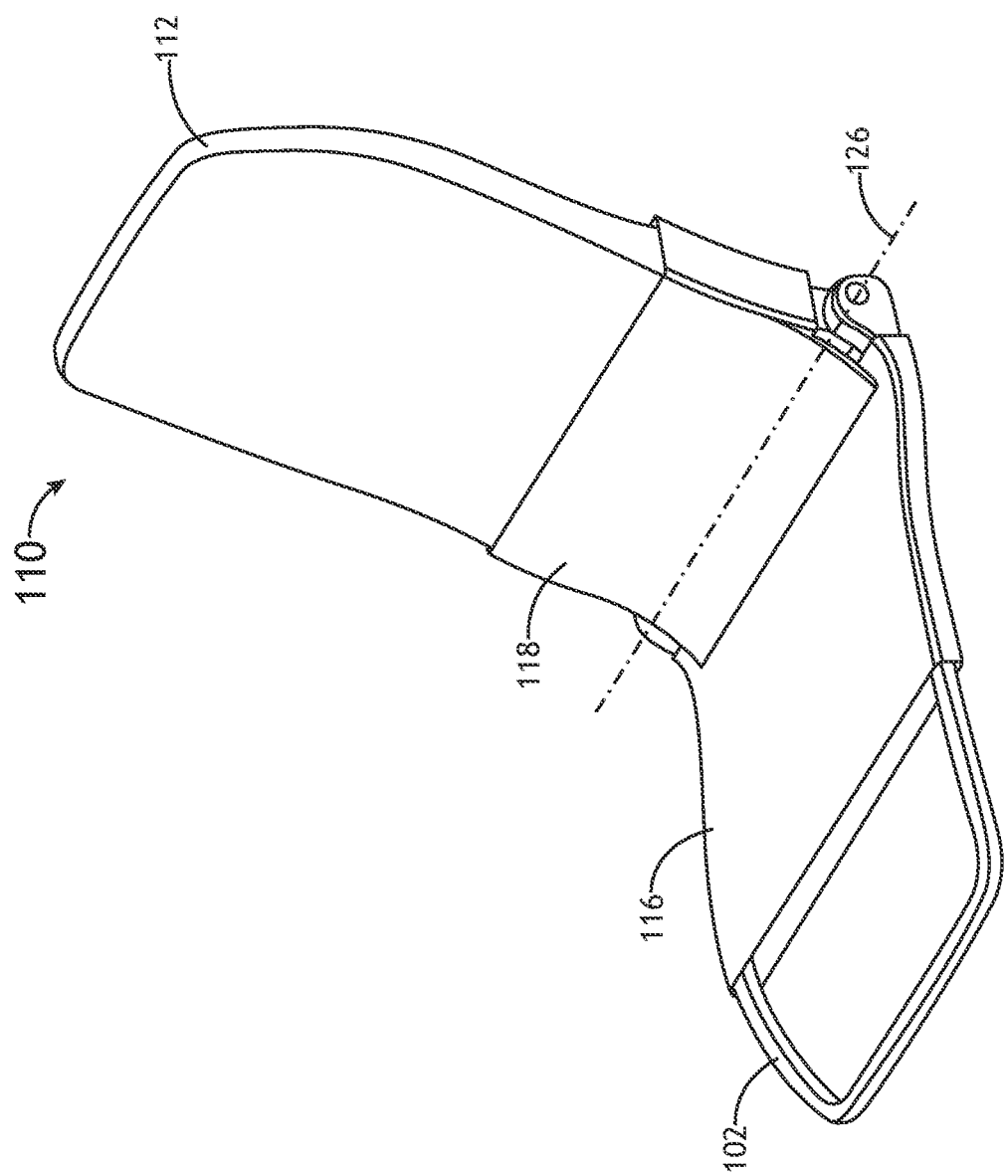
FIG. 6 is a perspective view of one of the seats shown in a partially deployed configuration, in accordance with example embodiments of this disclosure.

FIG. 6 illustrates a particular configuration of the backrest assembly 110 including the backrest 112 and surrounding backrest frame 114, and showing the backrest frame 114 rotated (e.g., pivoted) downward to form the bed support. In some embodiments, the first diaphragm 116 and the second diaphragm 118 may be attached and continuous to cover a lower portion of the backrest 112, the gap formed between the bottom of the backrest 112 and the back of the seat pan (not shown), and a portion of the framed opening defined by the backrest frame 114. In embodiments, the diaphragms 116, 118 may be constructed from resilient fabric and held in tension for comfort and support. In embodiments, each of the backrest 112 and the backrest frame 114 have the same axis of rotation 126, wherein the amount of rotation of the backrest 112 is limited to typical backrest recline and the amount of rotation of the backrest frame 114 allows the backrest frame 114 to be rotated at least between the reclined position of the backrest 114 and forward to contact the seat pans (e.g., substantially horizontal).

Figure 7:
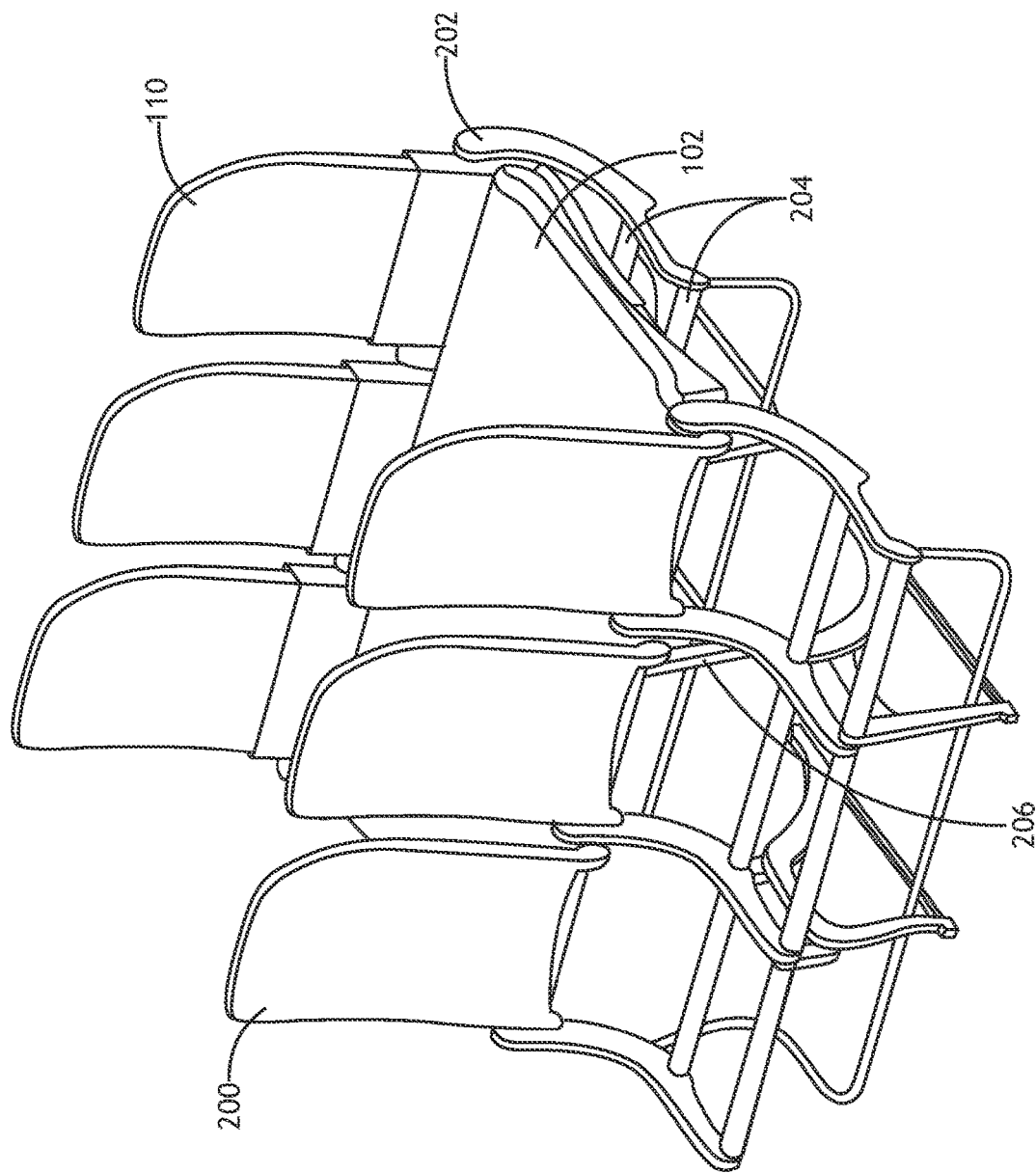
FIG. 7 is a perspective view of a portion of a passenger cabin including a seat row configured as a bed and a forward seat row configured as passenger seats, in accordance with example embodiments of this disclosure.
Figure 8:
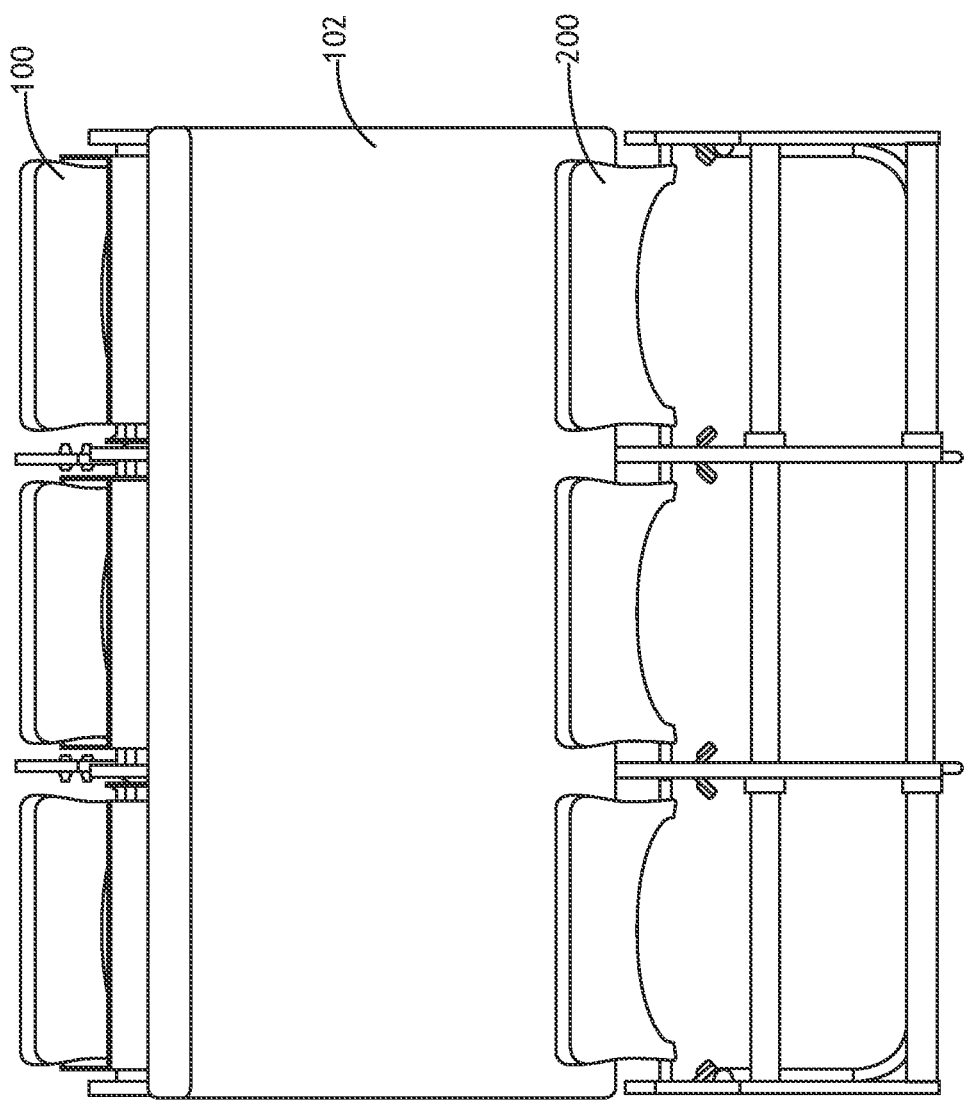
FIG. 8 is an overhead view of the passenger cabin illustrating the bed size and positional relationship to a forward seat row configured as passenger seats, in accordance with example embodiments of this disclosure.

FIGS. 7-9 illustrate the positional relationship between the converted seat row 100, and more particularly the fully deployed mattress 102, and the immediate forward row 200, for instance a forward row incapable of bed conversion. The mattress 102, when fully deployed, substantially occupies the space between the spaced backrests to provide a mattress width greater than a length of the seat pans for more room and sleeping comfort. With specific reference to FIG. 9, the deployed backrest frames 114 are positioned overlaying, and in some embodiments directly contracting, the underlying seat pans 108.

FIGS. 7-9 further illustrate a non-limiting example a seat frame construction for each of the seat rows 100, 200. The seat frame generally includes spreaders 202 positioned at the ends of the seat rows 100, 200 and between adjacent seats, spaced transverse beams 204 interconnecting the spreaders 202, and legs 206 for attaching the seat frames to the floor, such as to seat tracks embedded in the floor. The upper ends of the spreaders 202 support the rotational attachments of the backrest 112, backrest frames 114, and armrests (not shown). In embodiments, the backrests 112 and their respective frames 114 share the same axis of rotation and the armrests have a different axis of rotation considering their typical positioning of the armrests above the attachment of the backrests 112.

FIGS. 10A-B illustrate an embodiment of the backrest frame 114 including a separate headrest portion 128 rotatably coupled to frame side members 130. The headrest portion 128 generally corresponds to the head of the seat, and the rotational coupling of the headrest portion 128 allows the backrest frame 114 to closely correspond to the curvature of the backrest 112. For example, in some embodiments, the backrest 112 may have a generally concave shape from top-to-bottom for spine ergonomics and the rotational coupling allows a predetermined angle to be introduced into the backrest frame 112. FIG. 10B shows the deployed position of the backrest frame 114, the diaphragms 116, 118 positioned to fill the interior space of the backrest frame 114, and with releasable fasteners 132 positioned on each of the diaphragms 116, 118 configured to interact with fastener counterparts positioned on the bottom of the mattress (not shown). For example, the releasable fasteners may include hook-and-loop fasteners wherein one of the hook and loop is positioned on one component and the other of the hook and loop is positioned on the component to be removably attached. In some embodiments, the releasable fasteners on one of the diaphragms 116, 118 interacts with the releasable fasteners on the other diaphragm 116, 118 to maintain the folded state of the diaphragms 116, 118 when the backrest frame 114 is in the stowed position.

Figure 11:
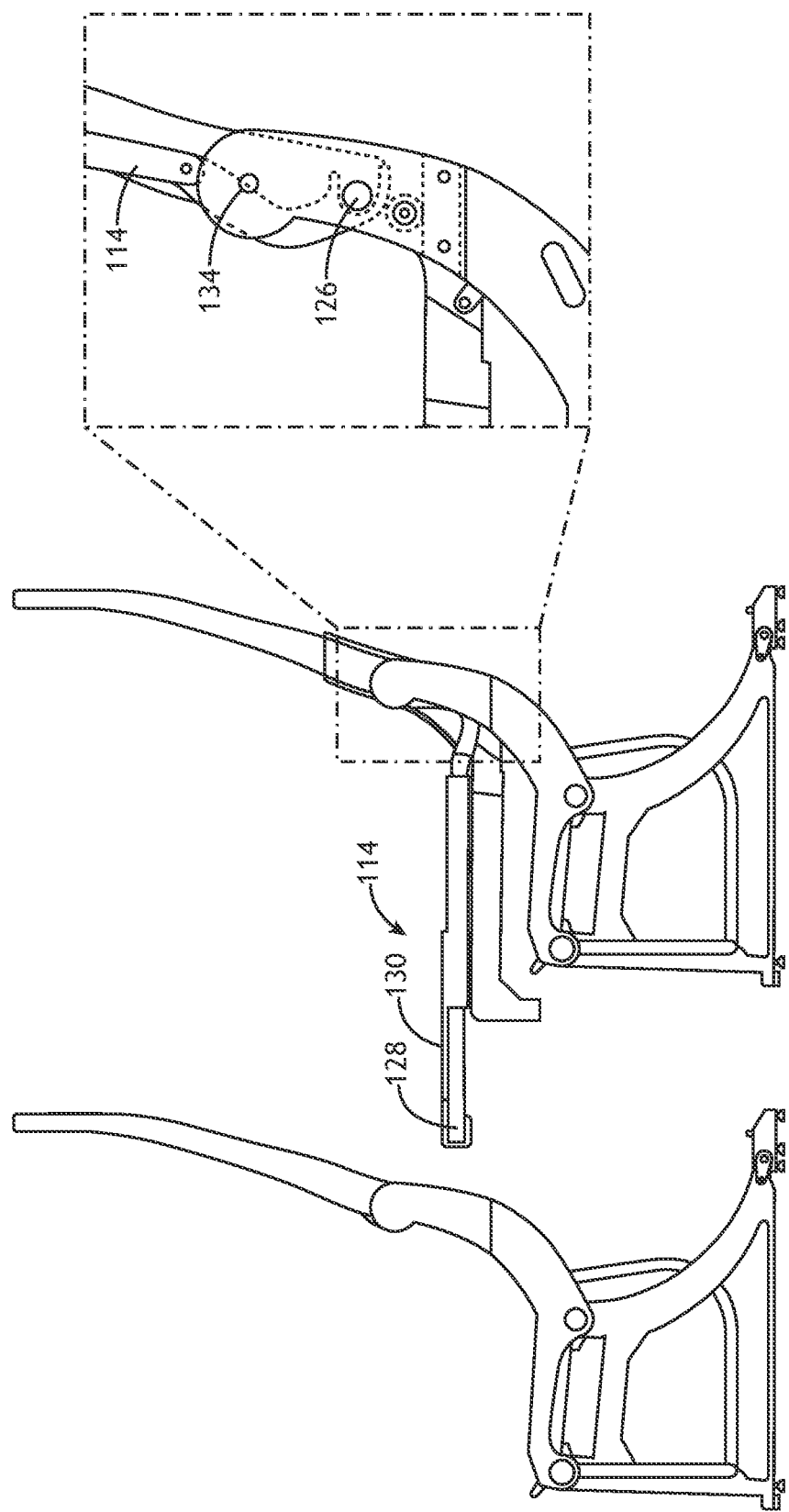
FIG. 11 is a side elevation and detailed view of a seat row with the alternative backrest frame construction shown converted to a bed, in accordance with example embodiments of this disclosure.

FIG. 11 illustrates the deployed position of the backrest frame 114 and the ability of the headrest portion 128 to be oriented substantially planar with the frame side members 130 to form a substantially horizontal support surface for the mattress (not shown). FIG. 11 further illustrates the same or shared axis of rotation 126 of the backrest 112 and backrest frame 114, as well as a possible location for the armrest pivot 134.

Figure 12:
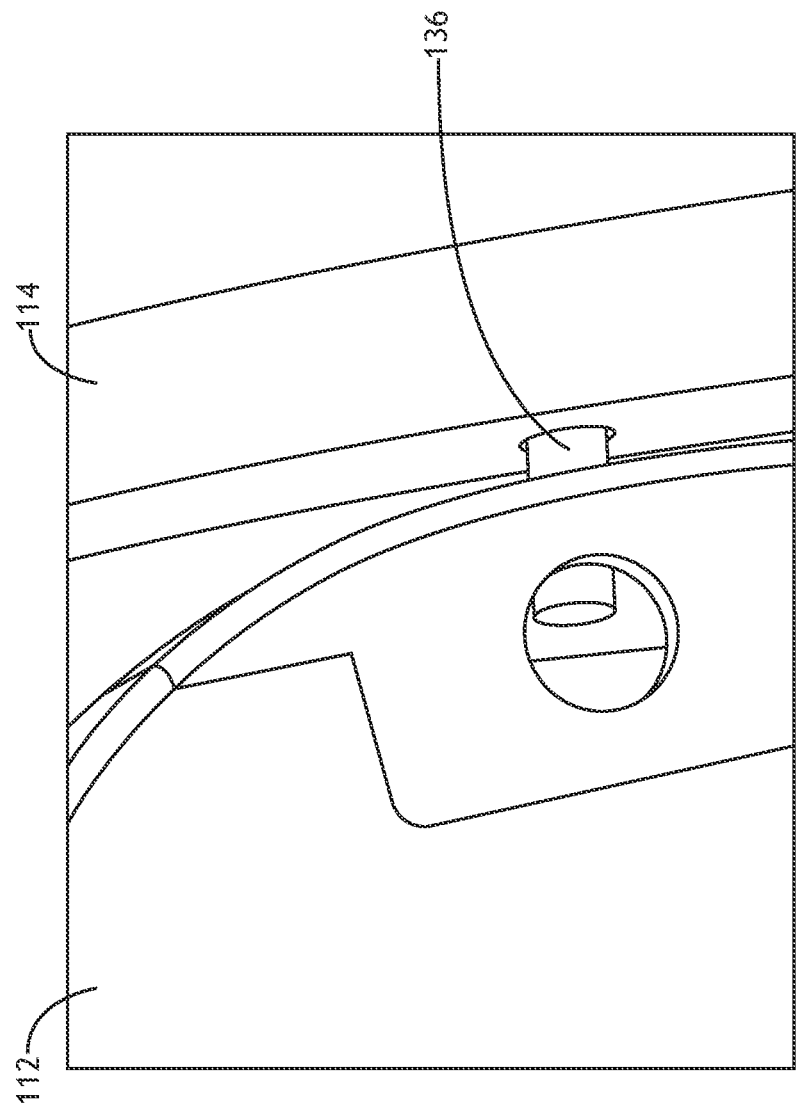
FIG. 12 is a detailed view illustrating a mechanism for locking the backrest frame to the backrest.

FIG. 12 illustrate a non-limiting of a mechanism for locking the backrest frame 114 to the backrest 112 such that the two travel together as the backrest moves between upright and reclined. As shown, the mechanism includes a spring-loaded pin 136 configured to be inserted into a opening formed in the backrest 112 to lock the backrest 112 and backrest frame 114, and retract from the opening to permit the backrest frame 114 to be rotated separately from the backrest 112. Other mechanism for locking the backrest 112 and the backrest frame 114 together are envisioned.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A seat row, comprising:
a plurality of seats supported by a seat frame;
each seat comprising a seat pan, a backrest, and a backrest frame positioned in surrounding relation to the backrest, the backrest frame movable between a stowed position with the backrest and a deployed position overlaying the seat pan, and the backrest frame comprising a diaphragm subassembly movable with the backrest frame; and
a mattress configured to be installed overlaying the backrest frames of the seats when the backrest frames are in their respective deployed positions.

2. The seat row according to claim 1, wherein:
the diaphragm subassembly includes a first part and a second part;
the second part is folded against the first part when the backrest frame is in the stowed position;
the second part is configured to be unfolded from against the first part when the backrest frame is in the deployed position; and
the first part and the second part together, when the second part is unfolded from against the first part, substantially fill an opening defined by the backrest frame.

3. The seat row according to claim 1, wherein the backrest and the backrest frame of each seat have a same axis of rotation.

4. The seat row according to claim 1, wherein the mattress is an air mattress configured to, when in a deflated state, fold and stow within an interior space positioned behind the diaphragm subassembly of one of the seats.

5. The seat row according to claim 1, wherein each seat further comprises an additional diaphragm covering a portion of the backrest and a gap formed between a bottom end of the backrest and the seat pan, and wherein the additional diaphragm is separate from and does not move with the backrest frame.

6. The seat row according to claim 1, further comprising an adjustable passenger restraint webbing configured to attach at one end to a forward seat frame and attach at an opposing end to a passenger restraint of one of the seats.

7. The seat row according to claim 1, wherein, when the backrest frame is in the stowed position, the diaphragm subassembly leaves uncovered a headrest portion of the backrest and covers a portion of the backrest positioned below the headrest portion.

8. The seat row according to claim 1, wherein the plurality of seats supported by a seat frame comprises at least three seats.

9. The seat row according to claim 1, wherein the backrest frame carries a spring-loaded release pin configured to engage in the backrest when the backrest frame is in the stowed position, and disengage from the backrest to allow the backrest frame to be moved toward the deployed position.

10. The seat row according to claim 1, further comprising fasteners for securing the mattress in place atop the deployed backrest frames.

11. The seat row according to claim 1, wherein the backrest and the backrest frame, when the backrest frame is in the stowed position, are configured to recline together as a single unit.

12. The seat row according to claim 1, wherein the seat frame comprises:
 spreaders positioned at the ends of the seat row and between the seats;
 spaced transverse beam tubes; and
 legs.

13. A seat row for installation in an economy class cabin of an aircraft, the seat row configured to convert from a seat row to a bed, the seat row comprising:
 three seats supported by a seat frame;
 each seat comprising a seat pan, a backrest, and a backrest frame positioned in surrounding relation to the backrest, the backrest frame rotatable between a stowed position with the backrest and a deployed position overlaying the seat pan; and
 a mattress configured to be installed overlaying the backrest frames of the seats when the seats are each in their respective deployed position.

14. The seat row according to claim 13, wherein:
 each seat further comprises a diaphragm assembly including a first part and a second part;
 the second part is folded against the first part when the backrest is in the stowed position;
 the second part is configured to be unfolded from against the first part when the backrest frame is in the deployed position; and
 the first part and the second part together, when the second part is unfolded from against the first part, substantially fill an opening defined by the backrest frame.

15. The seat row according to claim 14, wherein each seat further comprises an additional diaphragm covering a portion of the backrest and a gap formed between a bottom end of the backrest and the seat pan, and wherein the additional diaphragm is separate from and does not move with the backrest frame.

16. The seat row according to claim 14, wherein, when the backrest frame is in the stowed position, the diaphragm subassembly leaves uncovered a headrest portion of the backrest and covers a portion of the backrest positioned below the headrest portion of the backrest.

17. The seat row according to claim 13, wherein, for each seat, the backrest and the backrest frame have a same axis of rotation.

18. The seat row according to claim 13, wherein the mattress is an air mattress configured to, when in a deflated state, fold and stow within an interior space formed behind one of the backrests.

19. The seat row according to claim 13, wherein for each seat, the backrest frame carries a spring-loaded release pin configured to engage in the backrest when the backrest frame is in the stowed position, and disengage from the backrest to allow the backrest frame to be rotated toward the deployed position.

20. The seat row according to claim 13, wherein the backrest and the backrest frame, when the backrest frame is in the stowed position, are configured to recline together as a single unit.

* * * * *